United States Patent
Zegelaar et al.

(10) Patent No.: US 10,800,450 B2
(45) Date of Patent: Oct. 13, 2020

(54) STEERING ASSISTANCE SYSTEM AND METHOD

(71) Applicant: Ford Global Technologies, LLC, Dearborn, MI (US)

(72) Inventors: Peter W. A. Zegelaar, Heerlen (NL); Helmuth Bosch, Leverkusen (DE); Michael Schiebahn, Bornheim (DE)

(73) Assignee: Ford Global Technologies, LLC, Dearborn, MI (US)

(*) Notice: Subject to any disclaimer, the term of this patent is extended or adjusted under 35 U.S.C. 154(b) by 187 days.

(21) Appl. No.: 15/941,239

(22) Filed: Mar. 30, 2018

(65) Prior Publication Data
US 2018/0281848 A1 Oct. 4, 2018

(30) Foreign Application Priority Data
Mar. 31, 2017 (DE) .......... 10 2017 205 564

(51) Int. Cl.
*B62D 6/00* (2006.01)
*B62D 15/02* (2006.01)
*B62D 5/04* (2006.01)

(52) U.S. Cl.
CPC .......... *B62D 6/003* (2013.01); *B62D 5/0463* (2013.01); *B62D 15/024* (2013.01); *B62D 15/0255* (2013.01); *B62D 15/0265* (2013.01)

(58) Field of Classification Search
CPC .................................. B62D 6/003
See application file for complete search history.

(56) References Cited

U.S. PATENT DOCUMENTS

| | | | | |
|---|---|---|---|---|
| 8,543,261 B2* | 9/2013 | Anderson | ......... | B60W 50/0098 701/3 |
| 8,914,181 B2* | 12/2014 | Essame | .......... | B60W 30/18163 701/23 |
| 9,731,755 B1* | 8/2017 | Moshchuk | ............... | B62D 1/28 |
| 2008/0133066 A1* | 6/2008 | Takenaka | ........... | B60G 17/0195 701/1 |
| 2009/0088918 A1* | 4/2009 | Takenaka | ............ | B60T 8/17551 701/31.4 |
| 2014/0188341 A1* | 7/2014 | Takenaka | ............... | B62K 21/10 701/41 |
| 2014/0188342 A1* | 7/2014 | Takenaka | ............... | B62K 21/10 701/41 |
| 2018/0015919 A1* | 1/2018 | Hanzawa | .............. | B60W 50/16 |
| 2018/0244153 A1* | 8/2018 | Ejiri | ................... | G02B 27/0101 |

FOREIGN PATENT DOCUMENTS

| | | |
|---|---|---|
| DE | 10054647 A1 | 5/2002 |
| DE | 10303154 A1 | 9/2003 |
| DE | 10325587 A1 | 1/2004 |

* cited by examiner

*Primary Examiner* — Alex C Dunn
(74) *Attorney, Agent, or Firm* — Raymond L. Coppiellie; Burgess Law Office, PLLC (57) ABSTRACT

A method for determining a steering angle amplitude of a steering wheel of a vehicle likely to occur during a lane change, including determining a steering angle measured value of a steering wheel of a vehicle at a time of measurement during a lane change; determining a steering angular velocity measured value of the steering wheel at the time of measurement; and determining a steering angle amplitude likely to occur during the lane change at a later point in time than the time of measurement based on the at least steering angle measured value at the steering angular velocity measured value at the time of measurement.

16 Claims, 6 Drawing Sheets

STEERING ASSISTANCE SYSTEM AND METHOD

CROSS-REFERENCE TO RELATED APPLICATIONS

Not Applicable.

BACKGROUND OF THE INVENTION

1. Field of the Invention

The present invention relates to a system and method for determining a steering angle amplitude of a steering wheel of a vehicle likely to occur during a lane change.

2. Description of Related Art

Driver assistance systems assist a vehicle driver during vehicle control, for example during a lane change. An evasive steering assist (ESA) steering assistance system helps a driver change lanes upon encountering an unexpected obstacle, wherein the driver responds with a spontaneous evasive steering movement to circumnavigate the obstacle and the torque of the steering wheel is incrementally changed to match the traffic situation.

To positively influence the driving behavior of the vehicle steering intervention should take place only when the vehicle was previously in a stable driving state and the steering movement initiated by the driver makes it appear advantageous that the steering assistance system should influence the steering movement in a necessary amplifying or reducing manner. For example, when the steering movement appears to be insufficient or was initiated too late. The steering movement initiated by the driver must still be evaluated during the steering maneuver. Including detecting the extent of a steering movement initiated by a driver in a timely manner so steering assistance system input can be better matched to the steering movement initiated by the driver.

SUMMARY OF THE INVENTION

A method for determining a steering angle amplitude of a steering wheel of a vehicle likely to occur during a lane change including determining a steering angle measured value of a steering wheel of a vehicle at a time of measurement during a lane change and determining a steering angular velocity measured value of the steering wheel at the time of measurement. Determining a steering angle amplitude likely to occur during the lane change at a later point in time than the time of measurement based on the steering angle measured value and the steering angular velocity measured value at the time of measurement.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Other embodiments can be used and structural or logical changes can be made without deviating from the scope of protection of the present invention. The features of the different exemplary embodiments described can be combined with one another unless indicated otherwise elsewhere. The description should therefore not be interpreted to be limiting.

Figure 1:
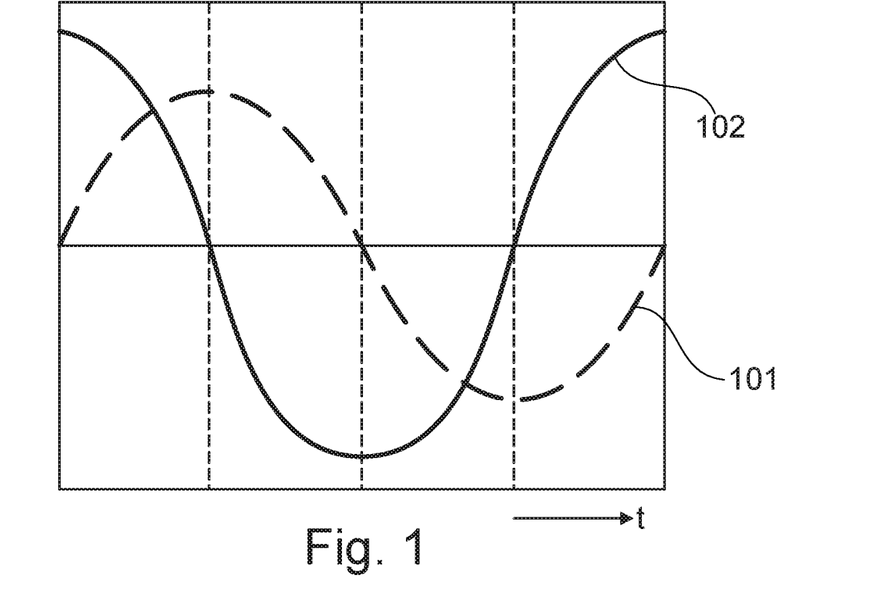
FIG. 1 is a diagram of a basic progression of a steering angle and associated steering angular velocity based on the assumption that progressions are sinusoidal.

FIG. 1 shows a diagram of a basic progression of a steering angle and the associated steering angular velocity based on an assumption that progressions are sinusoidal. Curve progression 101 shows a sine function $X(t)=A\cdot\sin(2\pi ft)$, wherein t is the time, f is the steering frequency, $X(t)$ is the steering angle, and A is the steering angle amplitude. The curve progression 101 corresponding to the progression of a steering angle of the steering wheel of a vehicle when the driver drives slalom with the vehicle or carries out a lane change. The curve progression 102 shows the derivative of $X(t)$ as a function of time and, therefore, the associated steering angular velocity $\dot{X}(t)=2\pi fA\cdot\cos(2\pi ft)$ having the amplitude $2\pi fA$. Considering that the sum of the squares of sine and cosine is one, this yields a finding that an estimated value for the steering angle amplitude $A_{est}$ can be determined as $$A_{est} = \sqrt{X(t)^2 + \left(\frac{1}{2\pi f}\dot{X}(t)\right)^2}.$$

For sinusoidal progressions there is no dependence on time, and for a time of measurement $t=t_m$, the estimated or likely occurring steering angle amplitude can be directly determined by measuring the steering angle $X(t_m)=\alpha_{stw}$ and the steering angular velocity $\dot{X}(t)=\dot{\alpha}_{stw}$ at this point in time, provided the steering frequency is known. Determination of $A_{est}$ is therefore possible even before the actual steering angle amplitude is reached during the rotation of the steering wheel.

Figure 2:
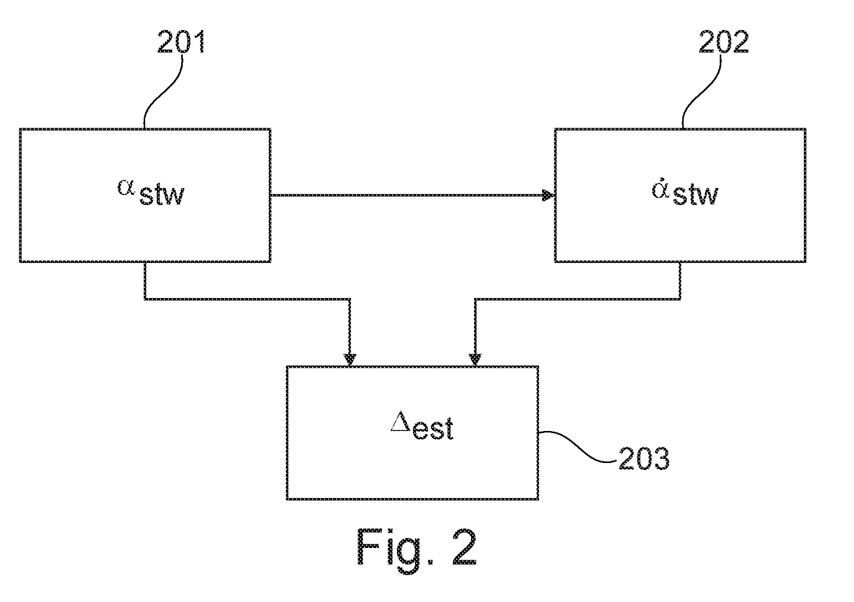
FIG. 2 is a schematic representation of a first embodiment of a method for determining a steering angle amplitude of a steering wheel of a vehicle likely to occur during a lane change.

FIG. 2 shows a schematic representation of a first example of a method for determining a steering angle amplitude of a steering wheel of a vehicle likely to occur during a lane change. The method includes the step 201 of determining the steering angle measured value $\alpha_{stw}$ of the steering wheel of the vehicle at a time of measurement $t_m$ during a lane change. In a further step 202, the steering angular velocity measured value $\dot{\alpha}_{stw}$ of the steering wheel is determined at the time of measurement $t_m$ and, in step 203 a determination of the steering angle amplitude $\Delta_{est}$ likely to occur during the lane change at a later point in time than the time of measurement $t_m$, is carried out as a function of at least the steering angle measured value $\alpha_{stw}$ and the steering angular velocity measured value $\dot{\alpha}_{stw}$ at the time of measurement $t_m$.

Figure 3:
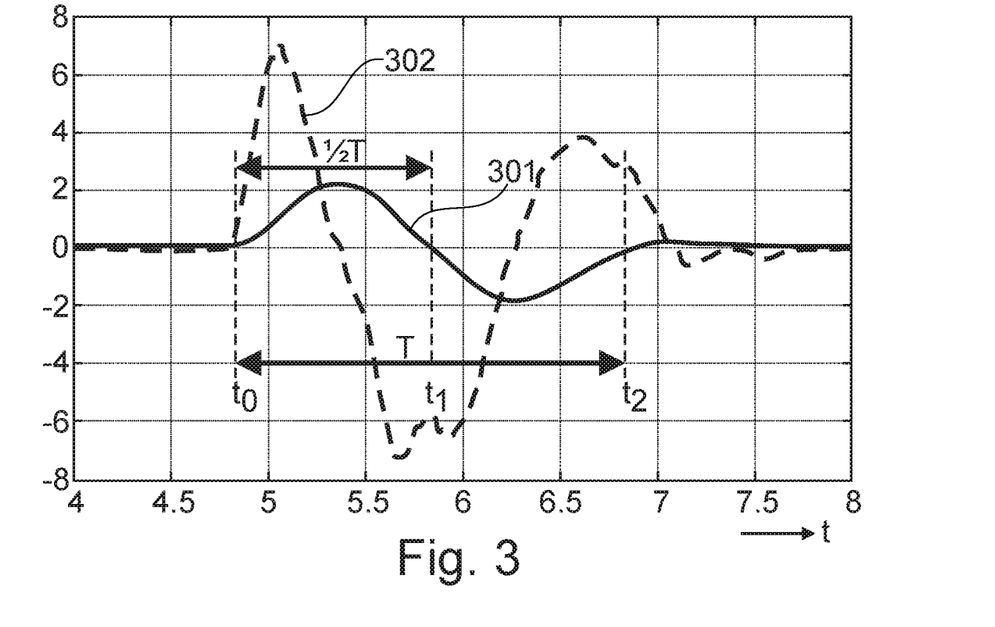
FIG. 3 is a diagram of an example of a possible progression of a steering angle and an associated steering angular velocity during a lane change.

FIG. 3 shows a diagram of a first example of a possible progression of a steering angle and an associated steering angular velocity during a lane change. The curve progression 301 shows the progression of the steering angle $\alpha_{stw}$ (in rad) over time (in seconds) due to the steering movement of the steering wheel by the driver, proceeding during a lane change similarly to the period of a sine function. The steering movement for the lane change begins at the point in time $t_0$. At the point in time $t_1$, the driver begins to counter-steer and the sign of the steering angle changes. At the point in time $t_2$, the steering movement ends and the vehicle travels straight ahead again. The curve progression 302 shows the associated measured progression of the steering angular velocity $\dot{\alpha}_{stw}$ (in rad/s). To estimate the amplitude of the steering angle $\alpha_{stw}$, an estimated value for the steering frequency is initially established. A typical maximum value $f_{max}$ for particularly rapid steering can be assumed, for example 0.7 Hz. A more accurate estimated value is determined, in the first half of the period T, and is then held constant in the second half-period. For example, the steering frequency at the time of measurement $t_m$ is estimated as $$f_{est} = \min\left(f_{max}, \frac{1}{2(t_m - t_0)}\right),$$

when $t_0 \leq t_m \leq t_1$. In this case, the estimated steering frequency is estimated to be lower, the slower the steering movement proceeds and the greater the time that transpires up to $t_1$. The likely occurring steering angle amplitude can now be determined, for example, as $$\Delta_{est} = \sqrt{\alpha_{stw}^2 + \left(\frac{1}{2\pi f_{est}}\dot{\alpha}_{stw}\right)^2}. \quad (1)$$

Figure 4:
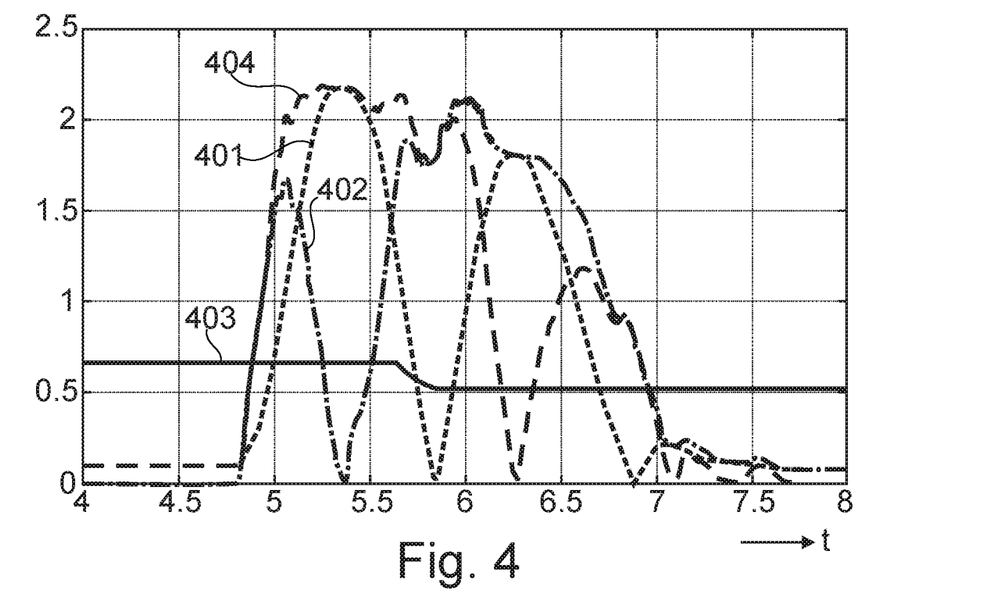
FIG. 4 is a diagram of a second example of a possible progression of a steering angle and an associated steering angular velocity including a steering angle amplitude during a lane change.

FIG. 4 shows a diagram of a second example of a possible progression of a steering angle and an associated steering angular velocity along with a likely steering angle amplitude during a lane change. The curve progression 401 shows a progression of the absolute value of the steering angle $\alpha_{stw}$ (in rad) over time (seconds) due to the steering movement of the steering wheel by the driver. The curve progression 402 shows the associated progression (in rad) of the absolute value of the steering angular velocity $\dot{\alpha}_{stw}$, normalized with the factor $(2\pi f)^{-1}$, wherein f (in Hz) is the steering frequency or lane change frequency, the progression represented in curve 403. The curve progression 404 shows the likely steering angle amplitude (in rad) ascertained according using formula (1), with the achieved phase advantage readily apparent. For example, the curve progression 404 already shows a likely steering angle amplitude of 2 rad at t=5.1 s, wherein the curve progression 401 of the steering angle first reaches the value 2 rad at t=5.25 s. The achieved phase advantage is 150 ms available, for example, for adapting a steering assistance system.

Figure 5:
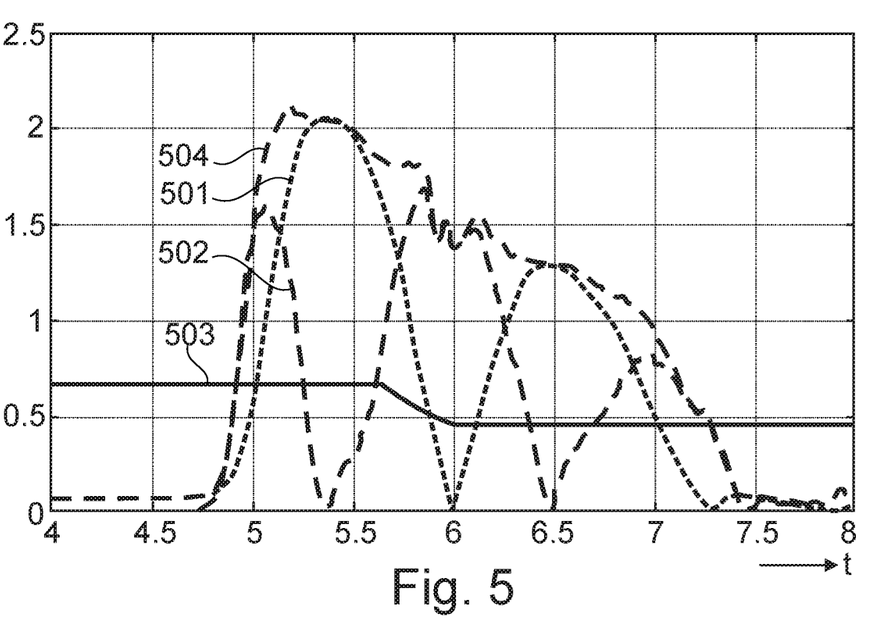
FIG. 5 is a diagram of a third example of a possible progression of a steering angle and an associated steering angular velocity including a steering angle amplitude during a lane change.

FIG. 5 shows a diagram of a third example of a possible progression of a steering angle and an associated steering angular velocity along with a likely steering angle amplitude during a lane change. In a manner similar to that shown in FIG. 4, the curve progression 501 shows the progression of the absolute value of the steering angle $\alpha_{stw}$ (in rad) over time (in seconds) due to the steering movement of the steering wheel by the driver. The curve progression 502 shows the associated progression (in rad) of the absolute value of the steering angular velocity $\dot{\alpha}_{stw}$, normalized with the factor $(2\pi f)^{-1}$, wherein f (in Hz) is the steering frequency or lane change frequency, the progression represented in curve 503. The curve progression 504 shows the likely steering angle amplitude (in rad) ascertained using formula (1). The changed steering behavior of the driver is reflected in the curve progressions. This is a substantially more asymmetrical steering, wherein the initial steering away from the direction of travel takes place more powerfully and rapidly than the eventual counter-steering. The likely steering angle amplitude decreases during the progression of the steering maneuver. The achieved phase advantage achieved at the beginning of the steering maneuver, is apparent.

Figure 6:
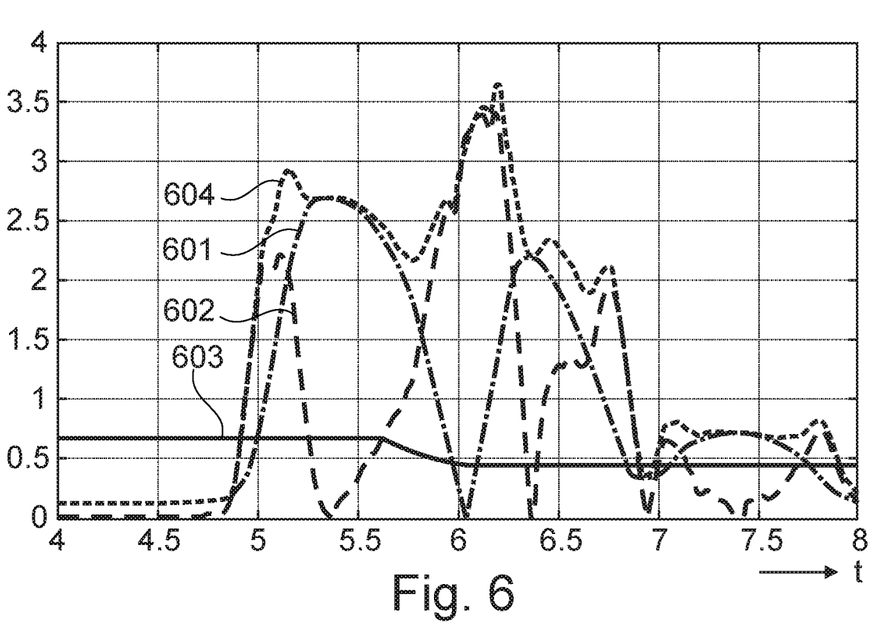
FIG. 6 is a diagram of a fourth example of a possible progression of a steering angle and an associated steering angular velocity including a steering angle amplitude during a lane change.

FIG. 6 shows a diagram of a fourth example of a possible progression of a steering angle and an associated steering angular velocity along with a likely steering angle amplitude during a lane change. In a manner similar to that represented in FIGS. 4 and 5, the curve progression 601 shows the progression of the absolute value of the steering angle $\alpha_{stw}$ (in rad) over time (in seconds) due to the steering movement of the steering wheel by the driver. The curve progression 602 shows the associated progression (in rad) of the absolute value of the steering angular velocity $\dot{\alpha}_{stw}$, normalized with the factor $(2\pi f)^{-1}$, wherein f (in Hz) is the steering frequency, the progression of which is represented in curve 603. The curve progression 604 shows the likely steering angle amplitude (in rad) using formula (1).

The curve progressions reflect the changed steering behavior of the driver, a substantially more asymmetrical steering, wherein the initial steering away from the direction of travel takes place more powerfully and rapidly than the eventual counter-steering. The likely steering angle amplitude decreases during the progression of the steering maneuver. The achieved phase advantage, achieved at the beginning of the steering maneuver, is also apparent. The steering movement shown proceeds in a jerky manner. The driver makes a very rapid steering deflection, maintains the maximum steering angle for a relatively long period of time, and then steers again in the opposite direction with a high steering angular velocity. The assumption of a sinusoidal progression of the steering angle over time is therefore inaccurate. Such jerky steering behavior can be identified, with reference to the progression 604 of the likely steering angle amplitude, by the curve progression 602 having a steering angular velocity normalized with $(2\pi f)^{-1}$ having values temporarily substantially higher than the curve progression 601 of the steering angle.

Figure 7:
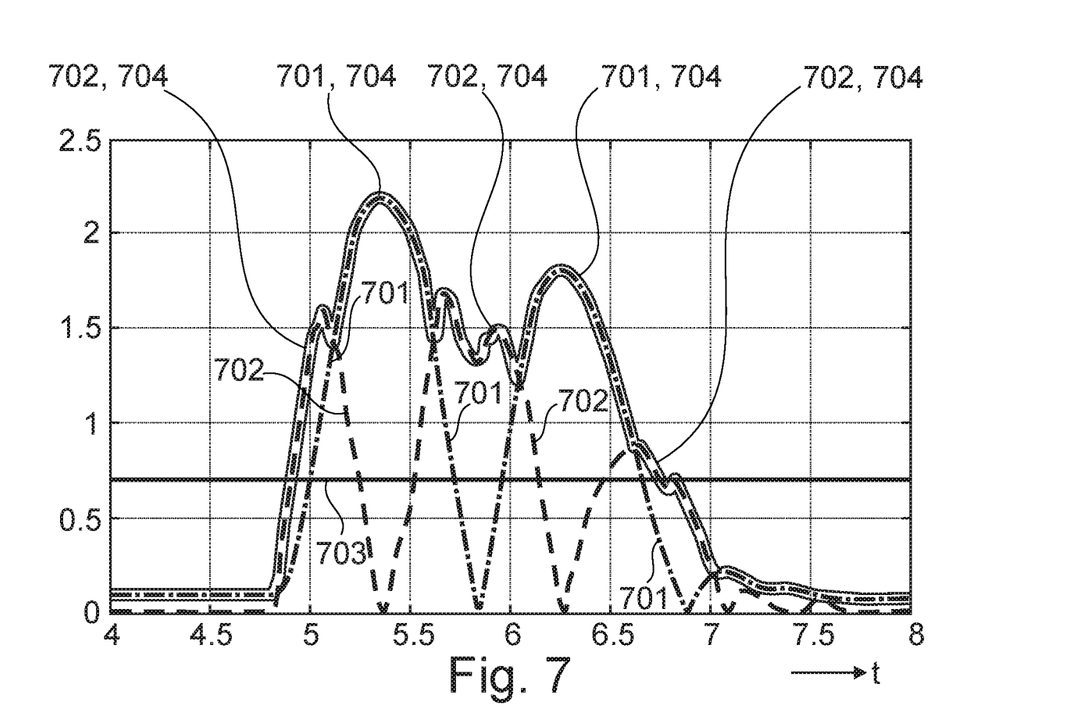
FIG. 7 is a diagram of a fifth example of a possible progression of a steering angle and an associated steering angular velocity including a steering angle amplitude during a lane change.

The likely steering angle amplitude is temporarily estimated too high, but never too low, and therefore, for example, a steering assistance system would not additionally amplify the steering movement. The beginning of the steering movement achieves a phase advantage in this non-sinusoidal steering movement. In other embodiments, the likely steering angle amplitude can be determined in another way. FIG. 7 shows a diagram of a fifth example of a possible progression of a steering angle and an associated steering angular velocity and the likely steering angle amplitude during a lane change. Similar to that represented in FIGS. 4, 5 and 6, the curve progression 701 shows a progression of the absolute value of the steering angle $\alpha_{stw}$ (in rad) over time (in seconds) due to the steering movement of the steering wheel by the driver. The curve progression 702 shows the associated progression (in rad) of the absolute value of the steering angular velocity $\dot{\alpha}_{stw}$, normalized with the factor $(2\pi f)^{-1}$, wherein f (in Hz) is the steering frequency or lane change frequency, the progression represented in curve 703. The curve progression 704 shows the ascertained likely steering angle amplitude (in rad). Here, the estimated steering frequency $f_{est}$ is set at the constant value of 0.7 Hz. The likely steering angle amplitude is the maximum value of the absolute values of the steering angle and the normalized steering angular velocity:

$$\Delta_{est} = \max\left(|\alpha_{stw}|, \left|\frac{1}{2\pi f_{est}}\dot{\alpha}_{stw}\right|\right) \quad (2)$$

The result is the curve progression 704 of the likely steering angle amplitude tracks either the curve progression 701 of the steering angle amplitude or the curve progression 702 of the normalized steering angular velocity, depending on which value is the higher value. The beginning of the steering movement achieves a phase advantage with this manner of determining the likely steering angle amplitude. In addition, with this manner of determination, the risk is reduced of obtaining values for the likely steering angle amplitude that are substantially too high due to high steering angular velocities due to very rapid steering.

Figure 8:
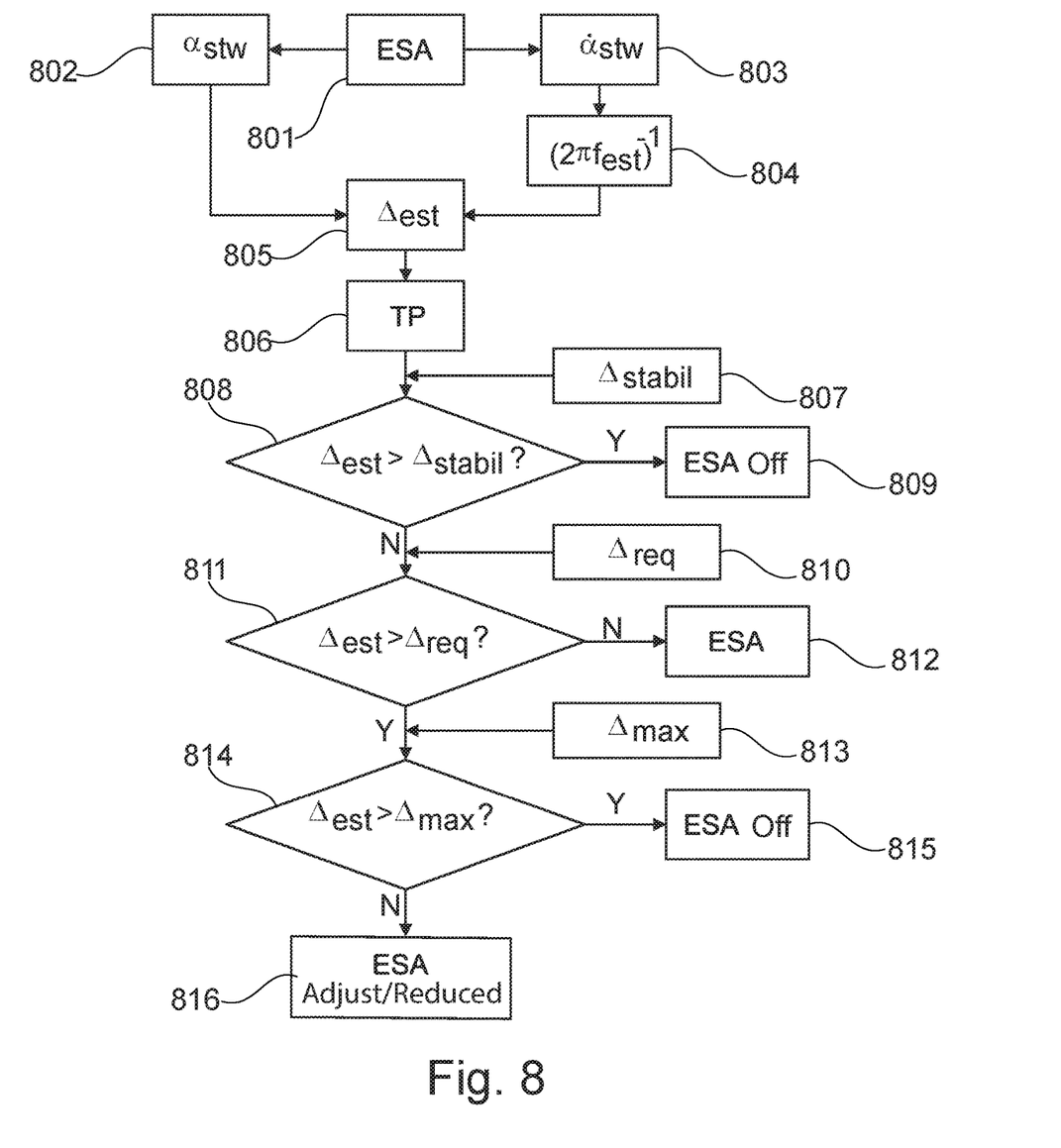
FIG. 8 is a schematic representation of a second embodiment of a method for determining a steering angle amplitude of a steering wheel of a vehicle likely to occur during a lane change.

FIG. 8 shows a schematic representation of a second example of a method for determining a steering angle amplitude of a steering wheel of a vehicle likely to occur during a lane change. As shown, the method also includes an evaluation of the likely steering angle amplitude for controlling a steering assistance system (ESA) before and during the lane change maneuver.

According to the method, in step 801 an additional steering torque is generated by a steering assistance system, if required, during the steering movement, in addition to the steering torque generated by the steering movement of the driver. Step 802 determines the steering angle measured value $\alpha_{stw}$ of the steering wheel of the vehicle at the time of measurement $t_m$ during a lane change and therefore detects the steering angle, optionally influenced by intervention of the steering assistance system. In the example shown, time is measured continuously, not only at selected points. And the steering angular velocity measured value $\dot{\alpha}_{stw}$ of the steering wheel at the particular time of measurement $t_m$ or during the measurement period is determined at step 803 and, in the exemplary embodiment shown, is normalized at step 804 with a normalization factor based on an estimate of the steering frequency, for example $(2\pi f)^{-1}$.

In step 805, a steering angle amplitude $\Delta_{est}$ likely to occur during the lane change at a later point in time than the particular time of measurement $t_m$ is determined as a function of at least the steering angle measured value $\alpha_{stw}$, step 802, and the steering angular velocity measured value $\dot{\alpha}_{stw}$, step 803. To smooth the function of $\Delta_{est}$, a low-pass filtering is initially implemented at step 806. Step 807 determines, dependent on speed, for example, a stability threshold value $\Delta_{stabil}$, which is a threshold value for the steering angle amplitude that defines the transition to an unstable driving behavior. Step 808 includes carrying out a comparison to determine whether the likely occurring steering angle amplitude $\Delta_{est}$ exceeds this stability threshold value $\Delta_{stabil}$. If so, the steering assistance system is switched off at step 809 or the steering is no longer assisted with additional generated torque.

In the described embodiment, step 810 includes determining a required steering angle amplitude $\Delta_{req}$, wherein the speed of the vehicle and the presence and distance to an obstacle, such as another vehicle, are ascertained. Further parameters including the speed of the obstacle are also optionally ascertained. Step 811 compares the steering angle amplitude $\Delta_{est}$ and the required steering angle amplitude $\Delta_{req}$, if the comparison finds that the likely occurring steering angle amplitude $\Delta_{est}$ does not reach at least the required steering angle amplitude $\Delta_{req}$, the steering movement is further amplified in step 812 with additional torque from the steering assistance system. Otherwise, in step 813 the method determines an upper threshold value $\Delta_{max}$ for the steering angle amplitude. This threshold value can correspond to the stability threshold value, although it can also be lower, for example, due to further influencing factors being considered, for example the distance to vehicles in other lanes. If in step 814 a comparison yields a finding that the likely occurring steering angle amplitude $\Delta_{est}$ exceeds this upper threshold value $\Delta_{max}$, the steering assistance system is switched off in step 815 or the steering is no longer assisted with the additional torque generated by the steering assistance system. Otherwise, the assistance provided by the steering assistance system can be adapted, for example reduced as in step 816.

Figure 9:
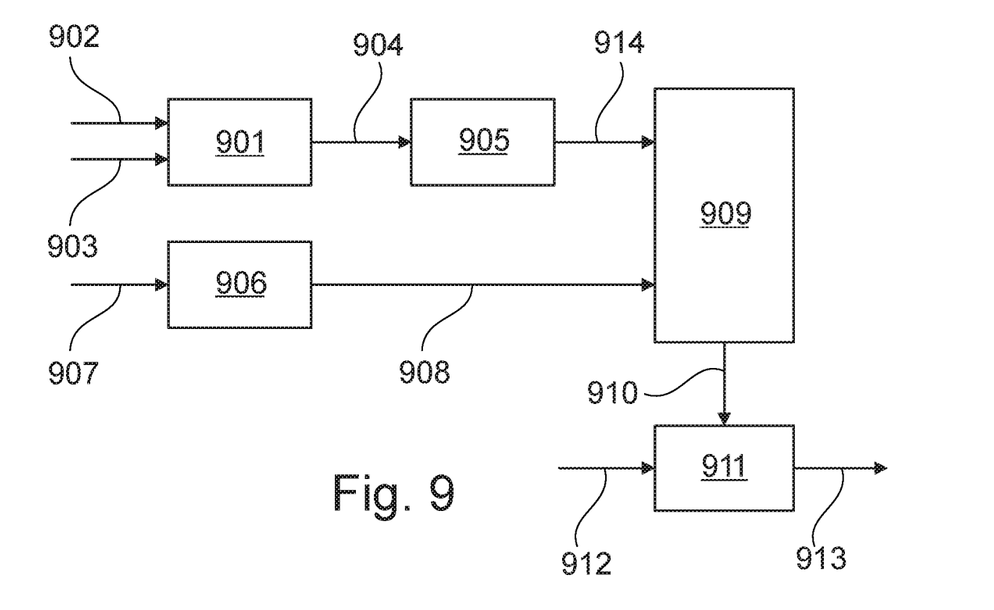
FIG. 9 is a schematic representation of a control of the activation state of a steering assistance system.

One embodiment activates the steering assistance system or its assistance during steering only when at the vehicle is already in a stable driving state in a time period before a lane change or evasive maneuver and that no dynamic steering movements were carried out. FIG. 9 shows a schematic representation of a corresponding control of the activation state of a steering assistance system. Here, block 901 includes a determination of the likely occurring steering angle amplitude $\Delta_{est}$ carried out continuously over time based on the continuously measured steering angle $\alpha_{stw}$, input 902, and the associated steering angular velocity $\dot{\alpha}_{stw}$ input 903, and the likely occurring steering amplitude $\Delta_{est}$ continuously determined in this way is fed, input 904, to a low-pass filtering at block 905, and an averaging over a window of time is carried out. In this way, for example, the filtered likely steering angle amplitude will be small if only a few steering movements have taken place in the window of time before the evasive maneuver is begun. In addition, block 906 includes a determination of a stability threshold value $\Delta_{stabil}$ taking place depending on the longitudinal speed of the vehicle from input 907, aided by which a distinction is made between a stable driving state and an unstable state or a state of dynamic steering. The stability threshold value $\Delta_{stabil}$, input 908 from block 906, is compared in block 909 with the value of the low-pass filtered, likely steering angle amplitude, input 914, and wherein block 909 generates activation information, output 910, that, aids the activation of the steering assistance, block 911; wherein during a lane change or evasive maneuver activation is prevented, if the stability threshold value is exceeded, or activation is otherwise permitted, and therefore, based on input 912, an adapted additional torque signal, output 913, is applied to the steering.

Figure 10:
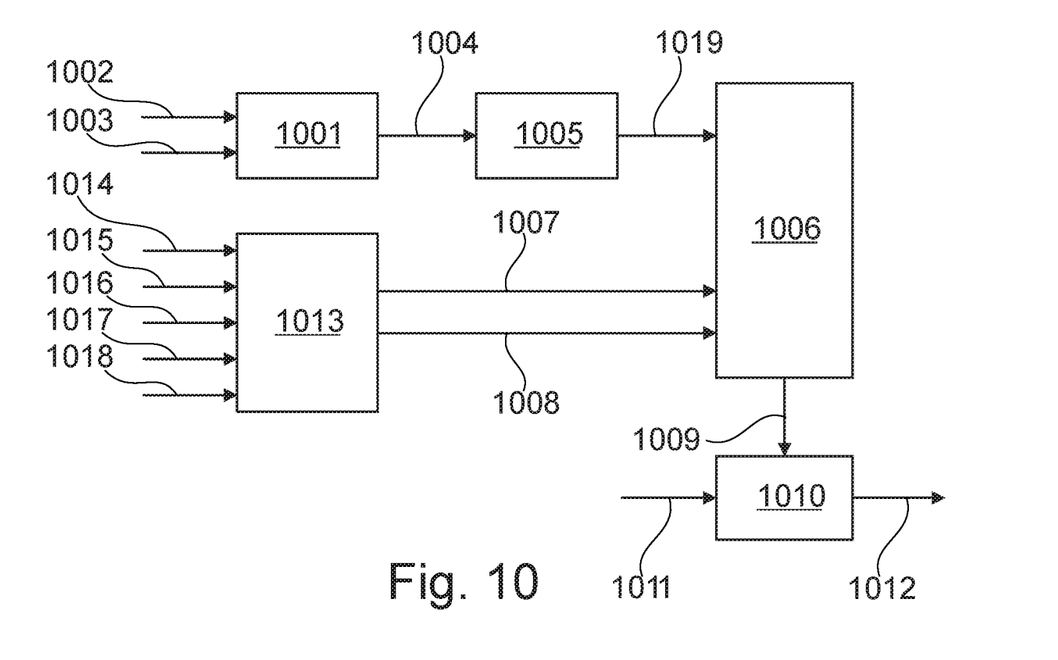
FIG. 10 is a schematic representation of a control of a parameter adaptation for a steering assistance system.

Provided the steering assistance system is activated during the lane change to assist the steering movement when the steering movement does not appear to take place powerfully enough or rapidly enough, one embodiment includes adapting the additional torque during the lane change according to vehicle and surroundings parameters. FIG. 10 shows a schematic representation of a control of a parameter adaptation for a steering assistance system. Block 1001 includes a determination of the likely occurring steering angle amplitude $\Delta_{est}$ carried out continuously over time during the steering movement based on the continuously measured steering angle $\alpha_{stw}$, input 1002, and the associated steering angular velocity $\dot{\alpha}_{stw}$, input 1003, with the likely occurring steering angle amplitude $\Delta_{est}$, output 1004, continuously determined in this way being fed to an intermediate memory, block 1005, in which the particular current maximum value is temporarily stored during the steering maneuver and output 1019 to block 1006 which continuously compares this value with an upper threshold value, output 1007, and a lower threshold value, output 1008, for the steering angle from block 1013.

Depending on the result of the comparison, different control parameter values, output 1009, are generated, aided by which the steering assistance, block 1010, is adapted. If the upper threshold value for the steering angle, which designates at least one limit for an unstable driving state, is exceeded or is optionally set to a lower value, the steering assistance is deactivated. If the lower threshold value, which describes an at least required steering angle amplitude, is fallen below, then, based on input signals 1011, operation of the steering assistance is continued using normal parameter settings and, optionally, the additionally generated torque signal 1012 is increased even further.

If the lower threshold value is exceeded, but the upper threshold value is not exceeded, the likely occurring steering angle amplitude is greater than is required, but it is not so great that the driving stability of the vehicle is endangered, it can be reduced. The extent of the reduction is ascertained, for example, by linear interpolation between the additional torques required for reaching the lower threshold value and the upper threshold value.

In the embodiment shown, block 1013 determines the upper threshold value, output 1007, and of the lower threshold value, output 1008, considering the speed, in particular the longitudinal speed, of the vehicle, input 1014, in addition block 1013 may consider the speed, in particular, the longitudinal speed of an obstacle, input 1015, for example, an obstructing vehicle in the direction of travel, and of the distance between the two vehicles, input 1016. The lateral offset, input 1017 required to circumnavigate the obstacle, and whether this offset is available, is considered. In addition, an assumed grip of the road, input 1018, can also be considered, which changes, for example, as a result of snowfall or ice.

Figure 11:
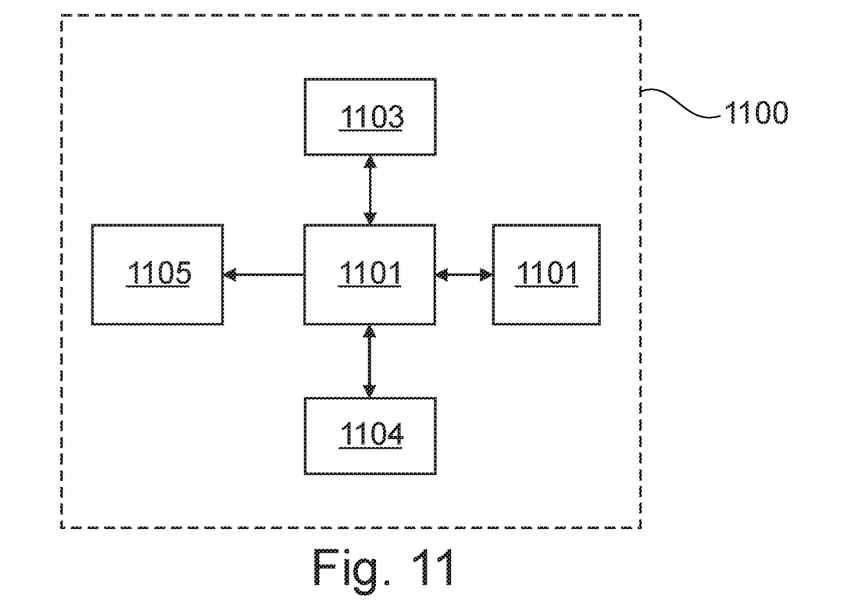
FIG. 11 is a schematic representation of an embodiment of a steering assistance system for a vehicle.

FIG. 11 shows a schematic representation of an example of a steering assistance system for a vehicle according to another embodiment. The steering assistance system 1100 designed for generating an additional torque and influencing a steering wheel movement during a lane change according to surroundings parameters and vehicle parameters, wherein the steering assistance system is designed for carrying out a method according to an embodiment of the invention.

In the example shown, the steering assistance system 1100 comprises a programmable device 1101, for example, an electronic control unit or microcontroller or processor, and a memory 1102. Via an interface 1103, the programmable device has access to vehicle parameters including vehicle speed information and steering angle, ascertained by suitable sensors. Via the same interface or a further interface 1104, the programmable device also has access to sensors to gather surroundings information, for example, radar information, LIDAR information, or camera information. The programmable device evaluates the data and carries out the method and therefore regulates the unit 1105 for generating the additional torque, aided by which the steering movement is optionally amplified or accelerated.

The method makes it possible to determine a steering angle amplitude of a steering wheel of a vehicle likely to occur during a lane change. The method includes a determination of a steering angle measured value $\alpha_{stw}$ of a steering wheel of the vehicle at a time of measurement $t_m$ during a lane change and a determination of a steering angular velocity measured value $\dot{\alpha}_{stw}$ of the steering wheel at the time of measurement $t_m$ and a determination of a steering angle amplitude $\Delta_{est}$ likely to occur during the lane change at a later point in time than the time of measurement $t_m$ as a function of at least the steering angle measured value $\alpha_{stw}$ and the steering angular velocity measured value $\dot{\alpha}_{stw}$ at the time of measurement $t_m$.

The steering angle amplitude refers to, in the exemplary embodiment, the maximum steering angle; i.e., the maximum rotational angle of the steering wheel of the vehicle, through which the driver rotates the steering wheel during the lane change maneuver relative to the zero or straight-ahead position thereof. The steering angle amplitude likely to occur, or the likely steering angle amplitude at a time of measurement, is an estimated value of the actual steering angle amplitude likely to be expected at a later point in time than the time of measurement $t_m$ based on steering angle information and steering angular velocity information available at the time of measurement.

The exemplary embodiment provides an estimated value for the actual steering angle amplitude during the steering maneuver, even before the driver has rotated the steering wheel by the maximum deflection they deem necessary, a phase advantage. The embodiment making it possible, for example, to activate or deactivate a steering assistance system or its influence on the steering in a timely manner, or to meter the influence of the steering assistance system onto the steering during the steering maneuver depending on the extent of the deviation of the likely steering angle amplitude value from a value ascertained by the system as being necessary.

In one embodiment, determination of the likely occurring steering angle amplitude includes weighting at least the steering angular velocity measured value $\dot{\alpha}_{stw}$ with a normalization factor dependent on an estimated steering frequency value $f_{est}$. The steering movement and, therefore, the progression of the steering angle during a lane change is typically at least approximately sinusoidal. Therefore, the progression of the steering angular velocity is at least approximately cosinusoidal. To account for the angle values and the angular velocity values in a comparably weighted manner within the scope of a formula, it is advantageous to normalize the steering angular velocity value depending on the estimated steering frequency value $f_{est}$, for example with the factor $(2\pi f_{est})^{-1}$.

The steering frequency to be expected during a lane change can be predicted within a certain range, for example depending on the vehicle properties, the properties of the steering wheel, the properties of the road, and other vehicles. An empirical value, for example, can be used as the basis for the expected or estimated steering frequency $f_{est}$, or it can be ascertained in tests or calculations.

In one exemplary embodiment, the estimated steering frequency value $f_{est}$ is at least 0.6 Hz and 0.8 Hz. Preferably, the estimated steering frequency value is $f_{est}$ 0.7 Hz. A value or range around this value limits a value range for a maximum expected steering frequency typically occurring for motor vehicles on a road during a lane change. In this way, a matching to rapid steering movements takes place, which occur, for example, during an unexpected evasive maneuver.

In one embodiment, the estimated steering frequency value $f_{est}$ is determined as $$f_{est} = \min\left(f_{max}, \frac{1}{2(t_m - t_0)}\right),$$

when $t_0 \leq t_m \leq t_1$, wherein $t_m$ is the time of measurement, $t_0$ is the point in time of the beginning of steering to begin the lane change, $t_1$ is the point in time of the beginning of a counter-steering to terminate the lane change, and $f_{max}$ is an estimated maximum steering frequency value.

When the vehicle travels straight ahead until $t_0$, the vehicle will travel along an increasingly narrow arc during the steering movement, due to the increasingly greater steering angle, until the steering angle amplitude has been reached. Afterward, when the driver begins to reduce the angle again, the vehicle will still travel along an arc, but the radius will increase again. If the steering angle is zero again or has reached the starting value or the straight-ahead value, the vehicle travels straight ahead, although at an angle away from the previous direction of travel. At this point in time $t_1$, the driver begins to counter-steer. To orient the vehicle again in parallel to the previous direction of travel, although now in another lane, the driver must move the steering wheel, starting at the point in time $t_1$, past the zero position; i.e., the starting position or the straight-ahead position, into the opposite direction of rotation. A value in the range from 0.6 Hz to 0.8 Hz, in particular 0.7 Hz, for example, can be assumed for the estimated maximum steering frequency value $f_{max}$; i.e., a frequency typical for a very rapid lane change.

The estimated steering frequency value $f_{est}$ is reduced, according to the described embodiment, in the first half of the progression of the steering angle, which is assumed to be sinusoidal, as compared to the estimated maximum steering frequency value $f_{max}$, when the driver steers slowly. The more slowly the steering movement by the driver takes place, the longer the time is until reaching the point in time $t_1$ and the lower the estimated steering frequency value $f_{est}$ is. $f_{est}$ is then held constant for the second half of the sinusoidal progression. In this way, the estimation of the steering frequency value is more accurately matched to the steering movement actually taking place at the moment.

In one embodiment, the likely occurring steering angle amplitude $\Delta_{est}$ is determined as $$\Delta_{est} = \sqrt{\alpha_{stw}^2 + \left(\frac{1}{2\pi f_{est}}\dot{\alpha}_{stw}\right)^2},$$

wherein $\alpha_{stw}$ is the steering angle measured value, $\dot{\alpha}_{stw}$ is the steering angular velocity measured value, and $f_{est}$ is the estimated steering frequency value. $\alpha_{stw}$ and $\dot{\alpha}_{stw}$ are time-dependent in this case ($\alpha_{stw}(t)$ and $\dot{\alpha}_{stw}(t)$) and yield, at each time of measurement $t=t_m$ or continuously, an associated value for the likely occurring steering angle amplitude $\Delta_{est}$.

The determination of the likely steering angle amplitude $\Delta_{est}$ is accurate when the underlying assumption is correct; the progression of the steering angle is sinusoidal over time and, therefore, the progression of the steering angular velocity, which is defined as the derivative thereof, is cosinusoidal. This is the case when the driver carries out slalom steering movements or a lane change maneuver. Forming the square root of the sum of the squares of the sinusoidal and cosinusoidal functions directly yields the likely steering angle amplitude, and an estimate can be rapidly calculated, even before the actual steering angle amplitude has been reached.

In one embodiment, before the likely steering angle amplitude is determined, a comparison between the steering angle measured value and the steering angular velocity measured value normalized with the factor $(2\pi f_{est})^{-1}$ is initially carried out. If the normalized steering angular velocity measured value is substantially higher than the steering angle measured value, this is an indication of jerky steering. When the driver carries out a steering movement rapidly, at a high steering angular velocity, maintains the maximum steering angle for a long time and then rapidly carries out a steering movement in the opposite direction, the assumption of a sinusoidal progression of the steering angle does not apply, or may inaccurately apply, and therefore the estimate thereof $f_{est}$ based thereon can be inaccurate. The estimate can be, for example, deactivated, switched to another estimating method, or the estimated value can be adapted aided by further correction parameters.

In another embodiment, the likely occurring steering angle amplitude $\Delta_{est}$ is determined as $$\Delta_{est} = \max\left(|\alpha_{stw}|, \left|\frac{1}{2\pi f_{est}}\dot{\alpha}_{stw}\right|\right),$$

wherein $\alpha_{stw}$ is the steering angle measured value, $\dot{\alpha}_{stw}$ is the steering angular velocity measured value, and $f_{est}$ is the estimated steering frequency value. The determination of the likely occurring steering angle amplitude takes place depending on which value is greater, either as the absolute value of the steering angle measured value $\alpha_{stw}$ or as the absolute value of the steering angular velocity measured value $\dot{\alpha}_{stw}$ normalized with $$\frac{1}{2\pi f_{est}}.$$

This manner of determining the likely steering angle amplitude simplifies the calculation compared to determining a square root of a sum of squares, allows for a greater speed of the calculation, and is also a simplification when the method is e implemented in a hardware circuit. There is a phase advantage, and therefore the value of the likely occurring steering angle amplitude is an estimate, at least temporarily, of the actual steering angle amplitude value before it occurs.

In another embodiment, a steering assistance system generates, at least temporarily, an additional steering torque during the lane change. This provides additional steering torque that can be utilized for amplifying a steering torque caused by the steering movement of the driver, for example when the determination of the likely steering angle amplitude indicates the steering movement appears not to be powerful or rapid enough to evade a detected obstacle.

In one embodiment, the determination of the steering angle measured value $\alpha_{stw}$, the determination of the steering angular velocity measured value $\dot{\alpha}_{stw}$, and the determination of the steering angle amplitude $\Delta_{est}$ likely to occur during the lane change at a later point in time than the time of measurement $t_m$ takes place at least over a measurement period for multiple times of measurement $t_m$ or continuously. Due to the repeated or continuous determination of the likely occurring steering angle amplitude value, current information regarding the driving state of the vehicle can be obtained, wherein additional information can be obtained from the progression or change thereof, for example, information regarding the steering behavior of the driver, which is helpful in the control of and implementation of a steering assistance system.

In one exemplary embodiment, the determination of the likely steering angle amplitude $\Delta_{est}$ includes an averaging of multiple likely occurring steering angle amplitudes determined at different times of measurement within the measurement period or a low-pass filtering of a steering angle amplitude continuously determined over the measurement period generating a smoothing or a memory effect. In this way, the averaged or filtered likely steering angle amplitude is also small when only a minimal amount of steering is carried out, for example in a measurement time window before an evasive maneuver or a lane change. The usability of the steering angle amplitude, for example in the control of the steering assistance system, is improved when the likely occurring steering angle amplitude is frequently updated or continuously determined.

In one embodiment, when the likely occurring steering angle amplitude is greater than a stability threshold value assigned to a stable driving state of the vehicle, the steering torque additionally generated by the steering assistance system is disengaged or is not engaged. In this way, a maximum steering angle can be established, at which the vehicle is still in a stable driving state, and which, when exceeded, indicates an unstable driving state. In this way, the steering assistance system does not engage with the steering of the vehicle when the vehicle is in an unstable state or the steering assistance system continues no started intervention, even though the vehicle is in an unstable state.

If further measurements find that the stability threshold value is no longer being exceeded and, therefore, the vehicle is again in a stable driving state, it can be provided that the additionally generated steering torque is engaged again.

In one exemplary embodiment, the stability threshold value depends on a speed of the vehicle wherein the evaluation of whether the vehicle is in an unstable state can be dynamically adapted to the actual state. In this way, it can be ensured that possibly dangerous driving situations do not occur due to implementing the steering assistance system at the wrong point in time.

In one embodiment, the method includes a determination of a required steering angle amplitude and a comparison of the likely occurring steering angle amplitude and the required steering angle amplitude. This provides a measure enabling a determination whether and to what extent there is a need for implementation of the steering assistance system. A check can be carried out during a lane change to determine whether the steering movement of the driver will suffice to evade an obstacle by a lane change or whether the influence of the steering assistance system should be adapted. If the likely occurring steering angle amplitude does not at least reach the required steering angle amplitude during the lane change, the steering assistance system will adapt the required torque, so at least the required steering angle amplitude is reached in a timely manner.

The required steering angle amplitude is dependent on parameters of the vehicle and the actual traffic situation, in particular on the presence of an obstacle in the direction of travel. An obstacle can be anything that renders an evasive maneuver or a lane change necessary, for example, another vehicle, a stopped vehicle, a more slowly driving vehicle, or an object or a person on the road.

In one exemplary embodiment, determination of a required steering angle amplitude takes place according to the speed of the vehicle, in particular, the longitudinal speed, and a distance between the vehicle and an obstacle. In this way, the remaining time can be determined by determining only two parameters, provided the obstacle does not move. If the obstacle is moving at a speed in the same direction as the vehicle carrying out the measurement, the calculated required steering angle amplitude is even only one maximum required value. This simple method is suitable, for example, for use during highway travel, in which the likelihood of a negative speed of the obstacle; i.e., an approach in the opposite direction of travel, is an unlikely case.

The distance to the object located ahead of the vehicle can be determined, for example, based on data gathered by a camera system, a radar system, or a LIDAR system of the vehicle.

Preferably, further parameters are incorporated into the determination of the required steering angle amplitude, to better account for the complexity and diversity of the traffic situations. In yet another exemplary embodiment, the determination of a required steering angle amplitude takes place according to at least the speed of the obstacle, a required lateral offset, and a grip of the road.

If the distance from the vehicle relative to the obstacle is monitored over time, the speed of the obstacle can also be ascertained. The determination of the vehicle speed and the distance relative to the obstacle determines the required steering angle amplitude in a way more accurately adapted to an actual traffic situation. In particular, when the obstacle moves toward the vehicle.

The lateral offset required to circumnavigate the obstacle or the lateral distance, for example, to other vehicles or the edge of the lane or a lane boundary may influence the required steering angle amplitude and, for example, limit the steering angle amplitude to a maximum permissible steering angle amplitude. A road friction change, for example, due to snow, ice, rain, oil, or a changed grip of the road can also limit the required steering angle amplitude to a permissible range. The embodiment can increase stability during a lane change and maintain the stability of the driving state of the vehicle during the lane change or evasive maneuver.

Upon determining a steering angle amplitude several times or continuously over a period of time, the maximum value of the likely occurring steering angle amplitude is temporarily stored, optionally updated, and utilized for comparison with the required value. In this way, the method becomes more robust, the likely steering angle amplitude is not assumed to be too low, and the use of the steering assistance system is not too extreme.

In one embodiment, when the comparison of the likely occurring steering angle amplitude with the required steering angle amplitude yields a finding that the likely occurring steering angle amplitude is greater than the required steering angle amplitude, the steering torque additionally generated by the steering assistance system is reduced. The required steering angle amplitude is therefore a lower limiting value. The process continues calculated during a lane change, in which the steering assistance system is amplified with an additional torque. If this lower limiting value is exceeded, the influence by the steering assistance system can be reduced.

In yet another embodiment, the comparison also includes a comparison of the likely occurring steering angle amplitude with an upper threshold value, and when the comparison yields a finding that the likely occurring steering angle amplitude is greater than the required steering angle amplitude and is greater than the upper threshold value, the steering torque additionally generated by the steering assistance system is disengaged. The upper threshold value is at least one upper limiting value and can correspond to a stability threshold value at which the driving state of the vehicle becomes unstable, but it can also be lower when other measured or assumed parameters of the traffic situation are also considered, for example, the grip of the road or the lateral offset. In this way, implementation of the steering assistance system does not negatively effect but instead positively effects the driving behavior in the situation.

In one embodiment, when the likely steering angle amplitude lies in a range between the required steering angle amplitude, the lower range limit or the lower threshold value of a permissible range for the steering angle amplitude, and the upper threshold value, the upper range limit of the permissible range for the steering angle amplitude, the assistance by the additional torque of the steering assistance system is interpolated, for example, linearly depending on how close the value of the likely steering angle amplitude comes to the upper or the lower range limit.

In addition, an embodiment includes a steering assistance system for a vehicle, designed for generating an additional torque according to surroundings parameters, vehicle parameters, and for influencing a lane change. The steering assistance system is designed for carrying out a method according to one of the above-described embodiments. In this way, the advantages and particularities of the method for determining a steering angle amplitude of a steering wheel of a vehicle likely to occur during a lane change are also implemented within the scope of a steering assistance system for a vehicle.

The steering assistance system can include a mechanism generating an additional torque and transferring the torque to the steering system of the vehicle. The system may include mechanisms, for example, sensors that detect or assess vehicle parameters such as the speed information or the steering angle and, optionally, sensors for determining information on vehicle surroundings, for example, radar, LIDAR, camera, or other mechanisms suitable for obtaining and accessing data from suitable and available sensors. The steering assistance system also includes a device programmed or programmable for carrying out at least parts of the disclosed embodiments.

An additional embodiment includes a computer program product including code components which, when run on a programmable device, prompt the programmable device to carry out a method according to one of the above-described embodiments. In this way, the advantages and particularities of the method are also implemented within the scope of a computer program product.

A programmable device is, for example, a control unit or a computer which includes a microcontroller or processor and a memory, wherein the memory stores instructions in the form of code components which can be run by the processor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for determining a steering angle amplitude of a steering wheel of a vehicle likely to occur during a steering maneuver, comprising:
   a steering assist system;
   providing a steering assist with the steering assist system;
   at least one sensor, said sensor detecting steering wheel movements applied by a driver of the vehicle to the steering wheel, said at least one sensor generating a steering wheel angle value and steering wheel angular velocity value;
   measuring the steering wheel angle value at a time of measurement during a steering maneuver;
   measuring the steering wheel angular velocity value at the time of measurement;
   determining a steering angle amplitude likely to occur during the steering maneuver at a later point in time than the time of measurement based on the measured steering wheel angle value and the measured steering wheel angular velocity value at the time of measurement; and
   controlling the steering assist provided by the steering assist system during the steering maneuver based on a deviation of the likely occurring steering angle amplitude value from a threshold value.

2. The method of claim 1 wherein the determination of the likely occurring steering angle amplitude includes weighting at least the measured steering wheel angular velocity value with a normalization factor dependent on an estimated steering frequency value.

3. The method of claim 2 wherein the estimated steering frequency value is between 0.6 Hz and 0.8 Hz.

4. The method of claim 2 wherein the estimated steering frequency value is determined as $$f_{est} = \min\left(f_{max}, \frac{1}{2(t_m - t_0)}\right),$$

when $t_0 \leq t_m \leq t_1$, wherein $t_m$ is the time of measurement, $t_0$ is the point in time of the beginning of steering to begin the steering maneuver, $t_1$ is the point in time of the beginning of a counter-steering to terminate the steering maneuver, and $f_{max}$ is an estimated maximum steering frequency value.

5. The method of claim 2 wherein the likely occurring steering angle amplitude is determined as $$\Delta_{est} = \sqrt{\alpha_{stw}^2 + \left(\frac{1}{2\pi f_{est}}\dot{\alpha}_{stw}\right)^2},$$

wherein $\alpha_{stw}$ is the measured steering angle value, $\dot{\alpha}_{stw}$ is the measured steering angular velocity value, and $f_{est}$ is the estimated steering frequency value.

6. The of claim 2 wherein the likely occurring steering angle amplitude is determined as $$\Delta_{est} = \max\left(|\alpha_{stw}|, \left|\frac{1}{2\pi f_{est}}\dot{\alpha}_{stw}\right|\right),$$

wherein $\alpha_{stw}$ is the measured steering angle value, $\dot{\alpha}_{stw}$ is the measured steering angular velocity value, and $f_{est}$ is the estimated steering frequency value.

7. The method of claim 1 including a steering assistance system that generates an additional steering torque during the steering maneuver.

8. The method of claim 1 wherein the measured steering wheel angle value, the measured steering wheel angular velocity value, and the determination of the steering angle amplitude likely to occur during the steering maneuver at a later point in time than the time of measurement take place at least over a measurement period for multiple times of measurement.

9. The method of claim 8 wherein the determination of the likely occurring steering angle amplitude includes an averaging of multiple likely occurring steering angle amplitudes determined in the measurement period at different times of measurement or includes a low-pass filtering of a steering angle amplitude determined continuously over the measurement period.

10. The method of claim 7 wherein if the likely occurring steering angle amplitude is greater than a stability threshold value assigned to a stable driving state of the vehicle the steering torque additionally generated by the steering assistance system is disengaged.

11. The method of claim 10 wherein the stability threshold value depends on a speed of the vehicle.

12. The method of claim 7 including:
determining a required steering angle amplitude; and
comparing the likely occurring steering angle amplitude and the required steering angle amplitude.

13. The method of claim 12 wherein the determination of a required steering angle amplitude takes place according to the speed of the vehicle and a distance between the vehicle and an obstacle.

14. The method of claim 13, wherein the determination of a required steering angle amplitude takes place according to the speed of the obstacle, a required lateral offset, or a grip of the road.

15. The method of claim 12 wherein if the comparison finds the likely occurring steering angle amplitude is greater than the required steering angle amplitude, the steering torque additionally generated by the steering assistance system is reduced.

16. The method of claim 12 including a comparison of the likely occurring steering angle amplitude with an upper threshold value; when the comparison finds the likely occurring steering angle amplitude is greater than the required steering angle amplitude and is greater than the upper threshold value the steering torque additionally generated by the steering assistance system is disengaged.

* * * * *